June 20, 1967 C. H. COKER 3,327,057

SPEECH ANALYSIS

Filed Nov. 8, 1963 5 Sheets-Sheet 1

INVENTOR
C. H. COKER
BY
Jules P. Kirsch
ATTORNEY

June 20, 1967 C. H. COKER 3,327,057

SPEECH ANALYSIS

Filed Nov. 8, 1963 5 Sheets-Sheet 3

June 20, 1967 C. H. COKER 3,327,057

SPEECH ANALYSIS

Filed Nov. 8, 1963 5 Sheets-Sheet 4

United States Patent Office 3,327,057

Patented June 20, 1967

3,327,057
SPEECH ANALYSIS

Cecil H. Coker, Berkeley Heights, N.J., assignor to Bell Telephone Laboratories, Incorporated, New York, N.Y., a corporation of New York Filed Nov. 8, 1963, Ser. No. 322,390
4 Claims. (Cl. 179—1)

This invention relates to the analysis of coupler waves, and in particular to the analysis of speech waves in bandwidth compression systems.

In order to make more economical use of the frequency bandwith of speech transmission channels, a number of bandwidth compression arrangements have been devised for transmitting the information content of a speech wave over a channel whose bandwidth is substantially narrower than that required for facsimile transmission of the speech wave itself. Bandwidth compression systems typically include at a transmitting terminal an analyzer for deriving from an incoming speech wave a group of narrow bandwidth control signals representative of selected information-bearing characteristics of the speech wave, and at a receiving terminal a synthesizer for reconstructing from the control signals a replica of the original speech wave.

One well-known bandwidth compression system is the so-called "resonance vocoder," specific forms of which are described in J. L. Flanagan Patent 2,891,111, issued June 16, 1959, and H. L. Barney Patent 2,819,341, issued Jan. 7, 1958. In a resonance vocoder, the distinctive information-bearing characteristics represented by the control signals and reconstructed at the receiving terminal are the frequency locations of selected peaks or maxima in the speech amplitude spectrum. These selected maxima correspond to vocal track resonances, that is, they correspond to frequency regions of relatively effective transmission through a talker's vocal tract, and in general it is the maxima corresponding to the three principal vocal tract resonances which are selected.

In a typical resonance vocoder analyzer, for example, an analyzer of the type described in the above-mentioned Flanagan patent, the spectrum of an incoming speech wave is divided into three fixed frequency subbands, and each subband embraces a frequency range within which a particular formant normally occurs. From the speech frequency components lying within a subband there is derived a narrow band control signal representative of the frequency at which a formant peak occurs in that frequency subband of the spectrum. However, as pointed out in M. R. Schroeder Patent 2,857,465, issued Oct. 21, 1958, it is an empirical fact that there is substantial overlapping between the frequency ranges within which formants normally occur. From time to time, therefore, a particular fixed frequency subband will contain more than one formant peak, a condition that will results in an erroneous indication of formant frequency location by the narrow band signal. For example, the narrow band signal derived by the previously mentioned Flanagan system represents the frequency location of the largest amplitude speech component within the subband, which generally occurs in the vicinity of a formant peak. Hence a frequency subband designed to embrace the normal frequency range of the second formant, for example, occasionally embraces both the first and second formant peaks, making it highly probable that on occasion the narrow band signal will represent the first instead of the second formant peak, since the first formant is generally larger than the second formant, and therefore the frequency components in the vicinity of the first formant will be generally larger than the frequency components in the vicinity of the second formant.

The previously mentioned Barney patent discloses a system that prevents the occurrence of two formants within a single frequency subband by determining formant locations sequentially instead of simultaneously, and by providing a tandem arrangement of high pass filters having variable low-frequency cutoff points. The first narrow band signal derived in the Barney system represents the location of the first formant, and this signal is employed to adjust the low-frequency cutoff point of a high pass filter through which the incoming speech wave is passed prior to locating the second formant. By adjusting the low-frequency cutoff point of the high pass filter to block the passage of that portion of the speech spectrum which contains the preceding first formant, the frequency subband from which the second formant is determined does not contain the first formant. The same procedure is followed for determining the frequency location of the third formant.

It will be appreciated, however, that the success of the Barney system depends to a large extent upon the adjustment of the low-frequency cutoff point of each of the high pass filters, since several relatively large speech components typically occur in the vicinity of a formant, and the cutoff point must exclude not only the frequency component with the largest amplitude nearest the preceding formant peak but also the relatively large frequency components immediately following the largest amplitude component. For example, if the cutoff point is set at too low a frequency, one or more of the components immediately following the largest component may be included in the frequency subband that is supposed to contain the next higher order formant. Since the components in the vicinity of a lower order formant generally have larger amplitudes than the components in the vicinity of a higher order formant, the presence of components from the vicinity of a preceding formant in the subband of a subsequent formant will prevent accurate determination of the location of the subsequent formant.

The present invention also improves the accuracy with which formants are located by preventing the occurrence of two formants within a single frequency subband, but the present invention prevents this occurrence by removing an entire preceding formant peak before determining the location of a subsequent formant. Two alternative arrangements are provided for removing formant peaks, one, an inverse filter arrangement for suppressing frequency components in the vicinity of a formant peak, and another, an arrangement for subtracting from the frequency components in the vicinity of a formant peak a corresponding group of reconstructed frequency components, thereby suppressing a formant peak by suppressing individual frequency components in the vicinity of the formant peak.

The invention will be fully understood from the following descriptions of illustrative embodiments thereof taken in connection with the appended drawings, in which.

Figure 1:
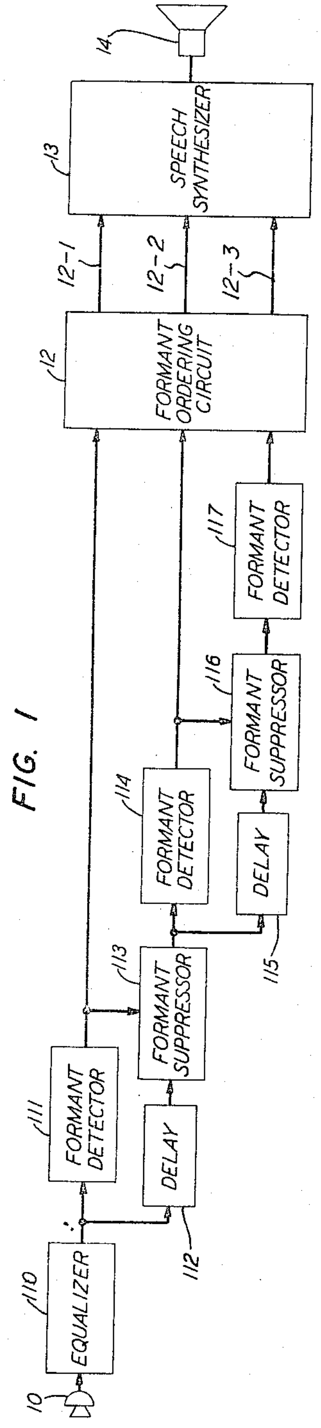
FIG. 1 is a block diagram showing a complete speech transmission system embodying the principles of this invention.
Figure 8A:
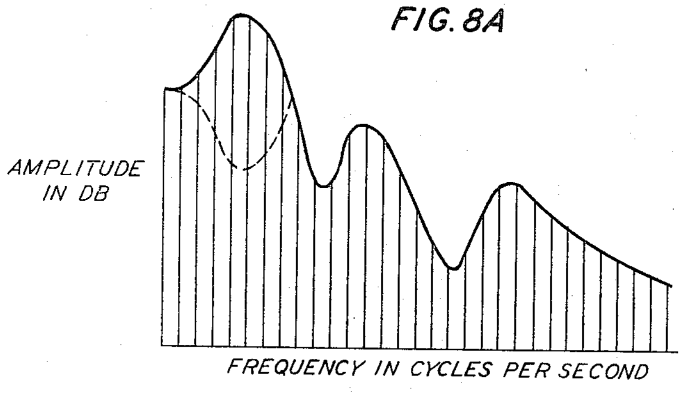
FIGS. 8A and 8B are additional graphs of assistance in explaining the operation of the present invention.

Referring first to FIG. 1, an incoming speech wave from source 10, which may be a conventional transducer for converting speech sounds into a corresponding electrical wave, is applied to equalizer 110. Equalizer 110, which is described in greater detail below, serves to adjust the amplitudes of the frequency components of the speech wave in order to optimize the operation of the formant detecting apparatus which follows. The equalized speech wave from equalizer 110 is simultaneously applied to formant detector 111 and to delay element 112. Formant detector 111 may be of any well-known construction; a suitable formant detector is described in the copending application of C. H. Coker, Ser. No. 322,389, filed Nov. 8, 1963 (C. H. Coker, Case 2). Formant detector 111 derives from a selected frequency subband of the equalized speech wave a first narrow band control signal representative of the location of the speech formant that normally occurs in that subband, for example, the first speech formant as shown in FIG. 8A. Delay element 112 serves to delay the equalized speech wave from equalizer 110 by an amount sufficient to compensate for the delay introduced by formant detector 111 in the detection of a speech formant, and the delayed, equalized speech wave from delay element 112 is applied to the input terminal of formant suppressor 113.

Formant suppressor 113, which may have one of the alternative forms shown in FIGS. 3A and 4 and described in detail below, is controlled by the narrow band control signal from detector 111 to suppress a formant peak by suppressing all of the frequency components in the vicinity of that formant peak in the incoming speech wave from delay element 112 which corresponds to the formant represented by the narrow band control signal. By suppressing all of the frequency components in the vicinity of a formant peak before detecting the location of the next formant peak, the frequency subband within which the next formant peak normally occurs will not contain any large amplitude components from the vicinity of the suppressed formant peak. Since the detection of formant locations is often based upon the frequency location of the largest amplitude components within a particular frequency subband, the suppression in this invention of frequency components in the vicinity of one formant peak prevents these components from being mistakenly recognized as indicating the location of another formant.

The output signal of suppressor 113 is also applied to delay element 115 in order to delay the output signal of suppressor 113 by an amount of time sufficient to compensate for the delay introduced by detector 114 in deriving a second narrow band control signal representative of another speech formant location. The second narrow band control signal from detector 114 is applied to the control terminal of formant suppressor 116, while the delayed output signal from suppressor 113 is applied to the input terminal of suppressor 116. Suppressor 116, which functions in a manner similar to suppressor 113, serves to suppress in the output signal of suppressor 113 the frequency components in the vicinity of that speech formant which corresponds to the formant represented by the narrow band control signal developed by detector 114. The output signal developed by suppressor 116 and delivered to formant detector 117 therefore has two fewer formants than are found in the original speech wave, so that in the situation where the apparatus of FIG. 1 is designed to locate the three principal speech formants, the output signal of suppressor 116 contains only one principal formant. The output signal of suppressor 116 is passed to formant detector 117, and detector 117 derives from this output signal a third narrow band control signal representative of still another speech formant, for example, the third principal speech formant.

Figure 5:
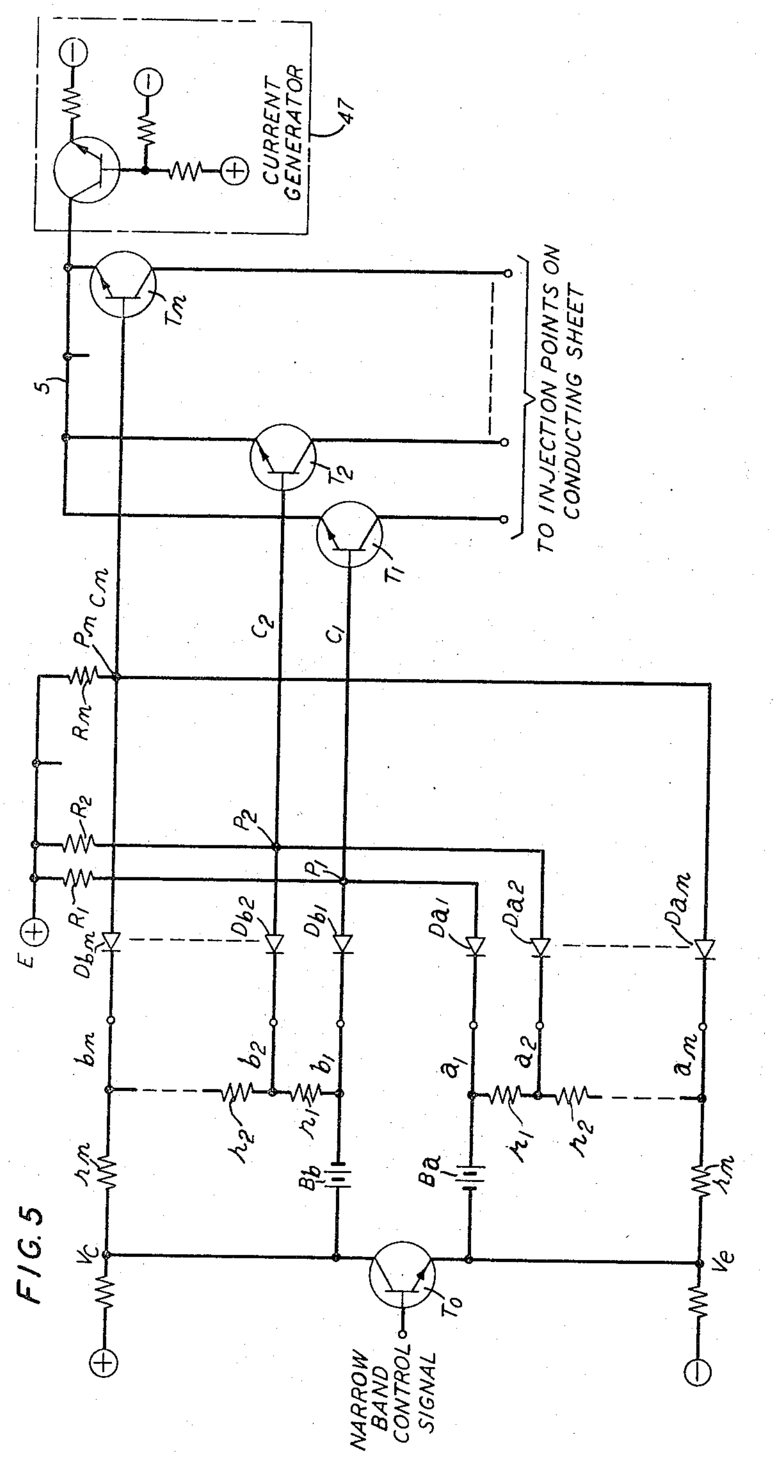
FIG. 5 is a schematic diagram illustrating in detail certain components of the apparatus shown in FIG. 4.

The narrow band control signals developed at the output terminals of detectors 111, 114, and 117 may be utilized to reconstruct a replica of the original speech wave in a suitable synthesizer 13, where it is understood that synthesizer 13 is to be supplied with the usual additional control signals necessary to specify completely the speech characteristics. A suitable synthesizer is disclosed in the previously mentioned Barney patent, and speech sounds may be reproduced from the reconstructed wave by a suitable transducer 14, for example, a loudspeaker of conventional design. It is important to note at this point, however, that in order for synthesizer 13 to reconstruct a replica of the speech wave having formants that occur at the same frequency locations as the formants of the original speech wave, it is necessary that the narrow band control signals from detectors 111, 114, and 117 unambiguously identify particular formants of the original speech wave. Thus referring to FIG. 8A, it is observed that the three principal formants are ordered in terms of their relative locations on the frequency scale, that is, for a given speech sound, the second formant occurs at higher frequencies than the first formant and lower frequencies than the third formant, and the third formant occurs at higher frequencies than the first and second formants. Although equalizer 110 may be constructed so that the first, second, and third narrow band control signals developed by detectors 111, 114, and 117, respectively, represent the first, second, and third principal speech formants in that order, it is contemplated that other types of equalizers may be employed, in which case the first, second, and third narrow band control signals respectively developed by detectors 111, 114, 117 may not necessarily represent the first, second, and third principal formant locations in that order. In the latter event, it is necessary to distinguish between the three narrow band control signals so that the proper narrow band signal may be applied to the proper input point of synthesizer 13, and this may be accomplished by passing the three narrow band control signals through formant ordering circuit 12. As shown in FIG. 5 and described in detail below, formant ordering circuit 12 rearranges the narrow band control signals as necessary in order for the narrow band control signal representative of the first formant location to appear on the first output lead 12–1, the narrow band control signal representative of the second formant location to appear on the second output lead 12–2, and the narrow band control signal representative of the third formant location to appear on the third output lead 12–3.

Figure 3B:
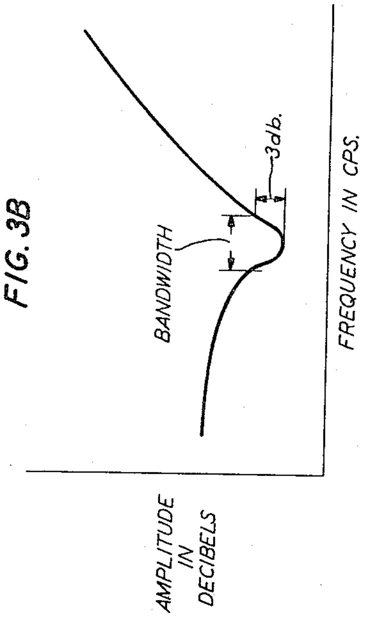
FIG. 3B is a graph of assistance in explaining the operation of the circuit shown in FIG. 3A.
Figure 3A:
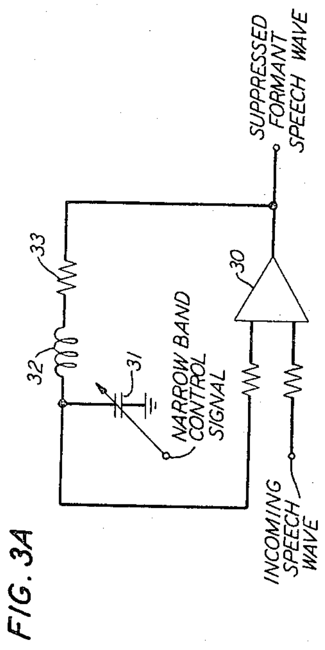
FIG. 3A is a schematic diagram illustrating in detail a formant suppressor of the type employed in the systems shown in FIG. 1 and FIG. 2.
Figure 4:
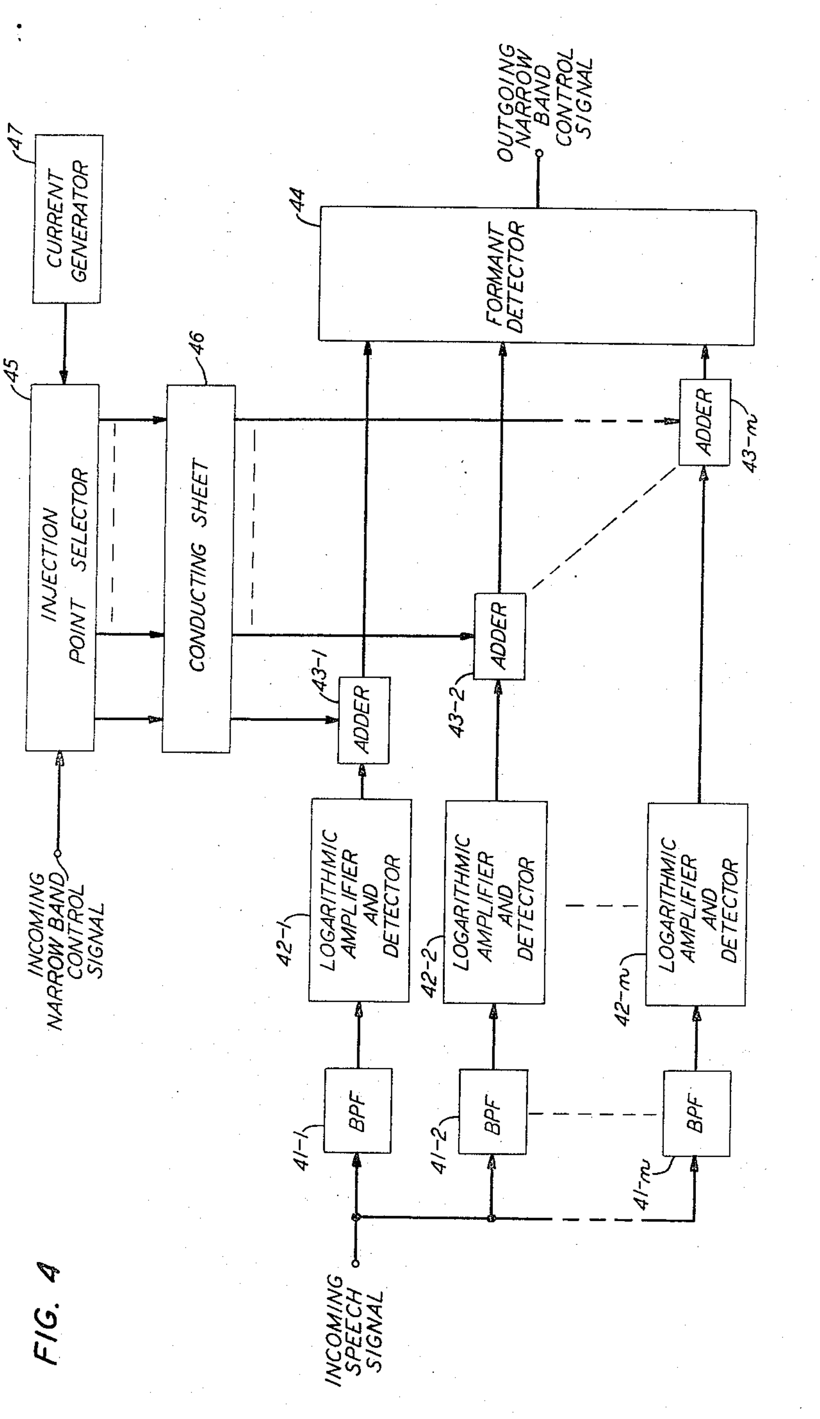
FIG. 4 is a block diagram of an alternative formant suppressor for use in the systems shown in FIG. 1 and FIG. 2.

Suppressors 113 and 116 in the apparatus shown in FIG. 1 may take either one of the alternative forms shown in FIG. 3A and FIG. 4. The structure illustrated in FIG. 3A may be characterized as a formant inverse filter having an amplitude-frequency characteristic of the variety shown in FIG. 3B. It is observed in FIG. 3B that the characteristic of this filter has a minimum at a particular frequency, and the inverse filter shown in FIG. 3A is controlled by a narrow band control signal from detector 111 or 114 to adjust the location of this minimum to coincide with the speech formant location represented by the narrow band control signal, thereby suppressing the frequency components in the vicinity of this formant in the manner illustrated in FIG. 8B. Further, the inverse filter shown in FIG. 3A is constructed so that its amplitude-frequency characteristic is the inverse or antiresonance of the type of resonance curve which characterizes speech formant peaks.

In the circuit shown in FIG. 3A, the formant control signal developed by one of the formant detectors shown in FIG. 1 is applied to the control terminal of an electronically adjustable capacitor 31 in the feedback loop of an operational amplifier 30. Inductor 32 and the resistor 33 in the feedback loop of operational amplifier 30 determine the bandwidth of the antiresonance curve shown in FIG. 3B, where the bandwidth is measured at a point 3 decibels above the minimum of the antiresonance curve. By applying the incoming speech wave from delay element 112 or delay element 115 to the input terminal of operational amplifier 30, the antiresonance of the inverse filter suppresses the frequency components in the vicinity corresponding to the formant peak in the speech wave which is represented by the formant control signal, so that the speech wave appearing at the output terminal of amplifier 30 no longer contains the formant represented by the formant control signal.

Figure 2:
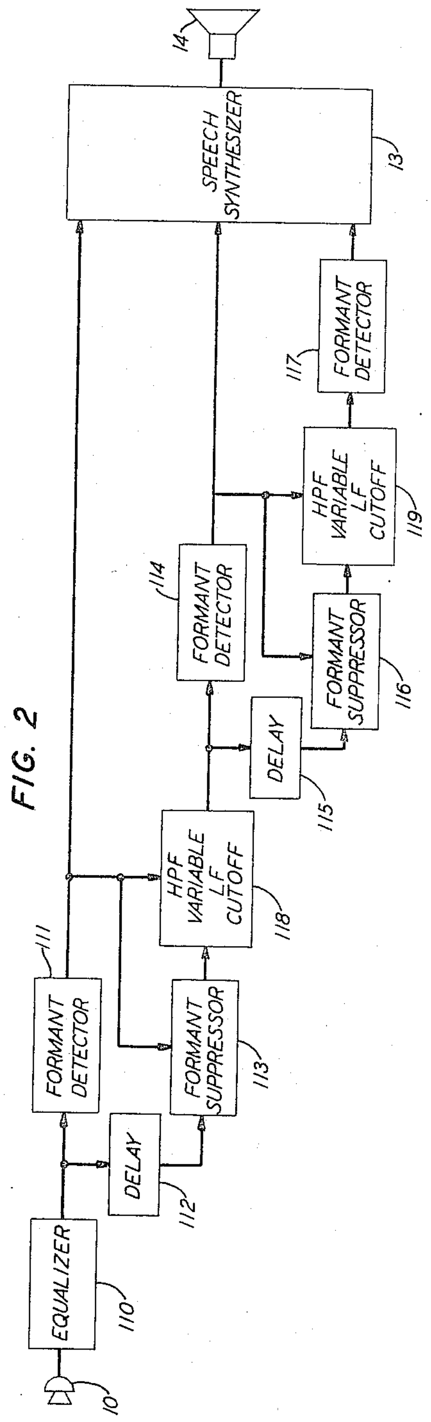
FIG. 2 is a block diagram illustrating an alternative speech transmission system embodying the principles of this invention.

When an inverse filter of the type shown in FIG. 3A is employed as a formant suppressor, it is necessary to modify the apparatus of FIG. 1 in the manner shown in FIG. 2. The modification is necessary because of the structure of the inverse filter, in which it is observed that an abrupt change in the magnitude of a narrow band control signal applied to variable capacitor 31 produces a noise burst in the output signal of the inverse filter. Since a noise burst introduces frequency components in the output signal which interfere with accurate determination of subsequent formant locations, the present invention eliminates this source of error by preventing abrupt changes in the magnitudes of the narrow band control signals.

It has been determined that the cause of abrupt changes in the magnitudes of the narrow band control signals is the intermittent appearance within a single frequency subband of an additional formant peak that is larger in amplitude than the formant peak originally detected in that subband. Since a formant detector of the type described in the above-mentioned Flanagan patent identifies a formant location by the frequency of the largest amplitude frequency component in a subband, the appearance of an additional, larger formant peak within a subband causes the mgnitude of the narrow band signal derived by the formant detector to shift abruptly from one value to another.

Figure 8B:
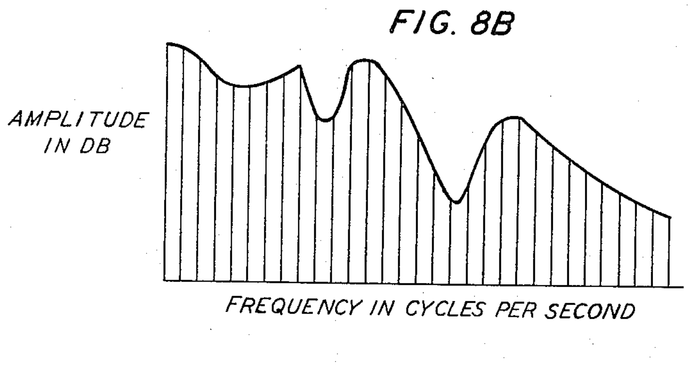

The present invention prevents abrupt changes in the magnitudes of the narrow band control signals by constraining each of the formant peaks always to be the largest peak within the subband covered by a particular formant detector. This is accomplished in two ways: First, the equalizer 110 is constructed to pre-emphasize the low-frequency components of the incoming speech wave from source 10, thereby ensuring that the first formant peak is larger than the second and third formant peaks, and that the second formant peak is larger than the third formant peak. However, by pre-emphasizing low-frequency components in equalizer 110, the inverse filters employed as formant suppressors 113 and 116 do not completely suppress all of the frequency components in the vicinity of a formant peak; that is, as shown in FIGS. 8A and 8B, some of the suppressed frequency components in the vicinity of the first formant may still have larger amplitudes than the frequency components in the vicinity of the second formant peak, thereby causing formant detector 114 to produce a narrow band control signal erroneously indicating the frequency of one of the insufficiently suppressed low-frequency components to be the frequency location of the second formant. To correct for this insufficient suppression of low-frequency components due to the pre-emphasis introduced by equalizer 110, the apparatus of FIG. 2 is also provided with high pass filter 118 inserted between formant suppressor 113 and formant detector 114 and high pass filter 119 inserted between formant suppressor 116 and formant detector 117. High pass filters 118 and 119 are provided with variable low-frequency cutoff points, for example, as shown in FIG. 3 of the previously mentioned Barney patent, and these cutoff points are respectively varied in response to the narrow band control signals applied from formant detectors 111 and 114. Filters 118 and 119 remove insufficiently suppressed low-frequency components in the vicinity of a preceding formant peak in response to the applied narrow band control signals, the cutoff points being preferably established at frequencies lying somewhat above the frequency locations of the formants represented by the applied narrow band control signals. In this manner, equalizer 110 and high pass filters 118 and 119 cooperate to constrain each of the formant peaks always to be the largest peak within the frequency subband covered by a particular formant detector, equalizer 110 by making the amplitudes of the formant peaks always inversely proportional to their frequency locations, and filters 118 and 119 by preventing a preceding larger amplitude formant peak from occurring within the frequency subband of a dormant detector that determines the location of a subsequent formant peak.

It is to be noted that the arrangement shown in FIG. 2 ensures that the first, second, and third narrow band control signals unambiguously identify the first, second, and third formants, respectively, of the original speech wave. Thus the formant ordering circuit 12 incorporated in the apparatus of FIG. 1 is not needed in the apparatus of FIG. 2, and circuit 12 is accordingly omitted from the embodiment illustrated in FIG. 2.

An alternative realization of formant suppressors 113 and 116 in FIG. 1 is illustrated in FIGS. 4 and 5. Referring first to FIG. 4, an incoming speech signal, for example, the signal from delay element 112 or delay element 115, is applied in parallel to a bank of contiguous or overlapping bandpass filters 41–1 through 41–$n$. The passbands of filters 41–1 through 41–$n$ span the entire frequency range of the incoming signal, so that there is developed at the output terminals of these filters a group of alternating signals representative of the frequency components of the incoming speech wave. Each bandpass filter 41–1 through 41–$n$ is followed by a conventional logarithmic amplifier and detector 42–1 through 42–$n$, respectively, and elements 42–1 through 42–$n$ develop from the group of alternating signals a corresponding group of unidirectional voltages proportional to the logarithms of the amplitudes of the components of the incoming speech wave. The group of unidirectional voltages from elements 42–1 through 42–$n$ is combined in adders 43–1 through 43–$n$ with the output signals of conducting sheet 46, where conducting sheet 46 may be constructed as described in J. E. Storer, Passive Network Synthesis, pages 278 through 280 (1957). Conducting sheet 46 is controlled through injection point selector 45, described below, by an incoming narrow band control signal to develop at its output points a group of unidirectional voltages representative of the logarithms of the amplitudes of frequency components in the vicinity of a formant peak corresponding in frequency to the formant peak indicated by the applied narrow band control signal. Further, the unidirectional voltages developed at the output points of conducting sheet 46 are opposite in polarity to the unidirectional voltages developed at the output terminals of elements 42–1 through 42–$n$, so that by combining in adders 43–1 through 43–$n$ the group of unidirectional voltages from elements 42–1 through 42–$n$ with the group of opposite polarity unidirectional voltages from conducting sheet 46 the speech frequency components in the vicinity of the formant peak represented by the narrow band control signal applied to element 45 are suppressed.

The output terminals of adders 43–1 through 43–$n$ are connected to a maximum value selector 44, which may be of the type described in J. L. Flanagan Patent No. 2,891,111, issued June 16, 1959. Maximum value selector 44 derives from the signals applied from adders 43–1 through 43–$n$ a narrow band control signal representative of a peak in the speech amplitude spectrum as defined by the speech component having the largest amplitude represented by the output signals of adders 43–1 through 43–$n$.

Figure 7:
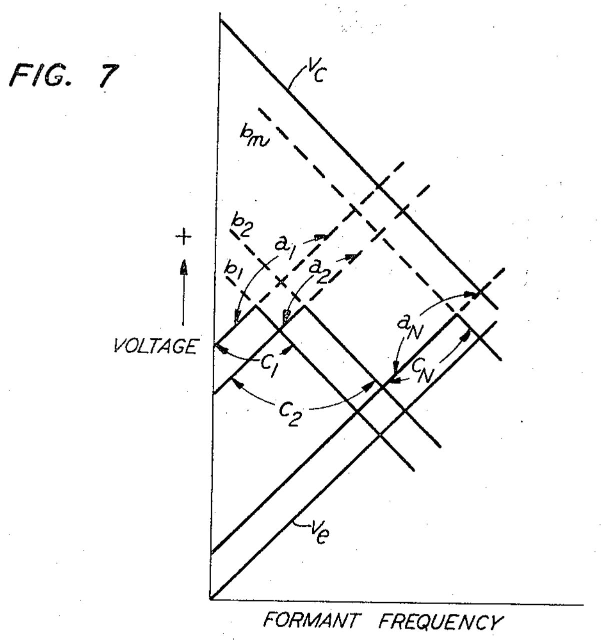
FIG. 7 is a group of graphs of assistance in explaining the operation of FIG. 5.

The frequency location at which conducting sheet 46 generates an opposite polarity formant peak is determined by the point at which a current from generator 47 is injected into the sheet, and the point at which it is injected into sheet 46 is controlled by injection point selector 45. Referring now to FIG. 5, this drawing illustrates in detail the structure of injection point selector 45. An incoming formant control signal is applied to the base of transistor $T_0$ which serves as a phase inverter to develop at its emitter terminal an emitter voltage $V_e$ that increases with the magnitude of the applied narrow band control signal, and to develop at its collector terminal a collector voltage $V_c$ that decreases with increases in the magnitude of the applied narrow control signal. The emitter voltage $V_e$ and the collector voltage $V_c$ as functions of the formant frequencies represented by the narrow band control signal are illustrated graphically in FIG. 7. Battery $B_a$ and resistors $r_1$ through $r_n$ develop from the emitter voltage $V_e$ a plurality of $n$ voltages $a_1$ through $a_n$ which differ by predetermined constant amounts from $V_e$ but which vary in the same manner as $V_e$. This is illustrated in FIG. 7 by the curves with positive slope denoted $a_1$ through $a_n$ which are offset from and parallel to the curve denoted $V_e$. Correspondingly, battery $B_b$ and resistors $r_1$ through $r_n$ develop from the collector voltage $V_c$ a plurality of $n$ voltages $b_1$ through $b_n$ which differ by predetermined constant amounts from $V_c$. The voltages $b_1$ through $b_n$ are illustrated in FIG. 7 by the curves with negative slope denoted $b_1$ through $b_n$ which are offset from and parallel to $V_c$.

Each of the voltages $a_1$ through $a_n$ is applied to a corresponding diode $D_{a1}$ through $D_{an}$, respectively, and each of the voltages $b_1$ through $b_n$ is applied to a corresponding diode $D_{a1}$ through $D_{an}$, and each of the voltages $b_1$ through $b_n$ is applied to a corresponding diode $D_{b1}$ through $D_{bn}$. The output terminals of diodes $D_{a1}$ and $D_{b1}$ are connected to an output point $P_1$ and the other diodes are similarly connected in pairs to output points $P_2$ through $P_n$. Output points $P_1$ through $P_n$ are connected through resistors $R_1$ through $R_n$ to a source of positive potential 51 so that the output signals $c_1$ through $c_n$ developed at corresponding output points $P_1$ through $P_n$ follow the more negative of the two corresponding voltages $a_1$, $b_1$ through $a_n$, $b_n$ applied to diodes $D_{a1}$, $D_{b1}$ through $D_{an}$, $D_{bn}$. Hence there is developed at output points $P_1$ through $P_n$ a group of voltages which vary in the manner shown by the solid lines denoted $c_1$ through $c_n$ in FIG. 7; for example, the output voltage $c_1$ follows the positive going voltages $a_1$ while it is more negative than the voltage $b_1$, but when the voltage $b_1$ becomes more negative than the corresponding voltage $a_1$ then $c_1$ follows $b_1$. By choosing voltages $a_1$ through $a_n$ and $b_1$ through $b_n$ to be offset by different amounts from voltages $V_e$ and $V_c$, it is observed in FIG. 7 that the voltages $c_1$ through $c_n$ will reach maxima at different points on the frequency scale. Thus, the voltage $c_1$ reaches a maximum at a lower frequency than voltage $c_2$, and voltage $c_n$ reaches a maximum at a higher frequency than any of the other voltages up to $c_n$. Each of the voltages $c_1$ through $c_n$ is applied to the base of a corresponding transistor $T_1$ through $T_n$, and the emitters of transistors $C_1$ through $C_n$ are connected via a common emitter bus 5 to a constant current generator 47. Depending upon which of the voltages $c_1$ through $c_n$ has the largest amplitude, the corresponding one of transistors $T_1$ through $T_n$ is made conducting, thereby applying the current from generator 47 to a corresponding current injection point on conducting sheet 46. The magnitude of the incoming narrow band control signal, which indicates the frequency location of a particular formant peak, determines the relative magnitudes of the voltages $c_1$ through $c_n$, hence transistors $T_1$ through $T_n$ are arranged to apply the current from generator 47 to an injection point on sheet 46 which corresponds to the frequency location indicated by the incoming narrow band control signal.

Even with the formant suppressor shown in FIG. 4, it is still necessary to prevent a subsequent formant detector from erroneously selecting the location of a low frequency region of relatively high energy instead of a formant peak to represent a formant frequency. This may be accomplished by constructing equalizer 110 in the apparatus of FIG. 1 to remove formant peaks occurring at frequencies higher than the first three principal formants, to remove the frequency characteristics in the speech wave due to the glottal source and the raditaion characteristics of the mouth as described by G. Fant, Acoustic Theory of Speech Production (1959) and to enhance the relative amplitudes of high frequency components by an amount on the order of 6 decibels per octave.

By employing an equalizer of this construction, however, the narrow band control signals developed at the output terminals of formant detectors 111, 114 and 117 do not consistently represent the same formant peaks; that is, for example, the narrow band control signal developed by detector 111 does not necessarily represent the first speech formant at all times, but may at times represent the second speech formant, and the same applies to the narrow band control signals developed by detectors 114 and 117. Since synthesizer 13 typically includes a separate circuit for reconstructing each of the three principal speech formants, for example, a separate resonator circuit, an abrupt change in the magnitude of a narrow band control signal applied to one of these resonator circuits will cause the resonator circuit to produce noise bursts, thereby imparing the quality of the reconstructed speech wave. It is therefore necessary to provide means for supplying to each resonator circuit in synthesizer 13 a narrow band control signal that consistently represents the same formant peak in the original speech wave. As shown in FIG. 1, this is accomplished by passing the three narrow band control signals through formant ordering circuit 12 prior to delivering the control signals to synthesizer 13.

Figure 6:
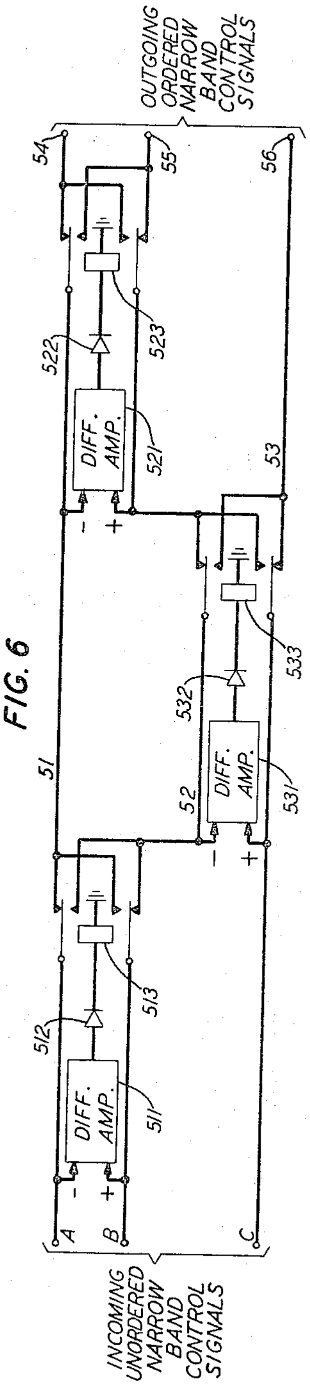
FIG. 6 is a schematic diagram illustrating in detail the formant ordering circuit shown in FIG. 1.

Turning now to FIG. 6, the incoming unordered narrow band control signals from detectors 111, 114 and 117 are applied to input points 51, 52 and 53, respectively. It is observed at this point that the magnitudes of the incoming formant control signals are proportional to the frequencies of the formants that they represent, that is, the magnitude of the narrow band control signal representing the first formant is smaller than the magnitudes of the narrow band control signals representing the second and third formants, and the magnitude of the control signal representing the second formant is smaller than the magnitude of the control signal representing the third formant. As shown in FIG. 6 two of the incoming narrow band control signals, denoted A and B, are applied to respective negative and positive input terminals of a conventional difference amplifier 511, and difference amplifier 511 develops at its input terminal a signal proportional to the difference in magnitude between the two control signals. If the magnitude of the control signal B applied to the positive input terminal of amplifier 511 is greater than the control signal applied to negative input terminal of amplifier 511, then difference amplifier 511 develops a positive output signal which is passed by diode 512 to energize relay 513, thereby delivering signal A to output lead 51 and signal B to output lead 52. However, in the event that A is greater in magnitude than B, then difference amplifier 511 develops a negative output signal which is blocked by diode 512, thereby de-energizing relay 513 and passing signals A and B in interchanged order; that is, the signal A is passed to output lead 52 and the signal B is passed to output lead 51. The third narrow band control signal, which is denoted C, is applied to the positive input terminal of difference amplifier 531, and the larger of the two signals, A and B, is applied to the negative input terminal of difference amplifier 531. Amplifier 531 develops at its output terminal a positive or a negative output signal, depending upon whether C is greater than the signal applied to its negative input terminal. In the event that a positive output signal is developed by difference amplifier 531, diode 532 passes the positive output signal, thereby energizing relay 533 and passing the control signals applied to the negative and positive input terminals of amplifier 531 in unchanged order to the positive input terminal of amplifier 521 and to lead 53, respectively. However, in the event that the output signal of amplifier 531 is negative, diode 532 blocks the negative output signal, thereby deenergizing relay 533 and passing the applied control signals in inverted order. Difference amplifier 521, diode 522 and relay 523 operate in the same manner as the preceding difference amplifier, diode, and relay arrangements to pass the incoming control signals from difference amplifiers 511 and 531 in either unchanged order or inverted order, depending upon their relative magnitudes. It is therefore evident that the apparatus of FIG. 6 operates to arrange at output points 54, 55 and 56 the incoming narrow band control signals according to their relative magnitudes, and the ordered narrow band control signals appearing at output points 54, 55 and 56 therefore consistently represent the frequency location of the same formant peak in the original speech wave. For example, the narrow band signal appearing at output point 54 always represents the first formant, because the formant ordering circuit shown in FIG. 6 always directs the narrow band control having the smallest magnitude to output point 54. It is to be understood, of course, that the circuit shown in FIG. 6 may be rearranged to direct a control signal of given relative magnitude to appear at any one of the three output points 54, 55, 56.

Although this invention has been described in terms of speech communication systems of the type shown in FIG. 1, it is to be understood that applications of the principles of this invention are not limited to these systems, but include such related fields as automatic speech recognition, speech processing, and automatic message recording and reproduction. In addition, it is to be understood that the above-described embodiments are merely illustrative of the numerous arrangements which may be devised for the principles of this invention by those skilled in the art without departing from the spirit and scope of the invention.

What is claimed is:

1. Apparatus for suppressing a selected formant of a speech wave which comprises a source of an incoming speech wave, means supplied with said speech wave for obtaining a first group of unidirectional signals representative of the amplitudes of the frequency components of said speech wave, a source of a control signal having a magnitude representative of the frequency location of a selected formant of said speech wave, means responsive to said control signal for generating a second group of unidirectional signals of opposite polarity to said first group of unidirectional signals, wherein said second group of unidirectional signals is representative of the amplitudes of selected frequency components in the vicinity of the formant represented by said control signal, and means for combining said first and second groups of unidirectional signals.

2. Apparatus for suppressing a selected formant of a speech wave which comprises a source of an incoming speech wave, means supplied with said speech wave for obtaining a first group of unidirectional signals representative of the amplitudes of the frequency components of said speech wave, a source of a control signal having a magnitude representative of the frequency location of a selected formant of said speech wave, selector means responsive to the magnitude of said control signal and provided with a plurality of output points for delivering a constant current to a selected one of said output points in accordance with the magnitude of said control signal, means provided with a plurality of input points each connected to a corresponding one of said plurality of output points of said selector means for generating a second group of unidirectional signals of opposite polarity to said first group of unidirectional signals, wherein said second group of unidirectional signals is representative of the amplitudes of selected frequency components in the vicinity of the formant represented by said control signal, and means for combining said first and second groups of unidirectional signals.

3. Apparatus for determining the frequency locations of selected formants of speech sounds which comprises a source of an incoming speech wave, equalizer means supplied with said speech wave for enhancing the relative amplitudes of the high frequency components of said speech wave by predetermined relative amounts and for eliminating selected frequency components of said speech wave, thereby to develop an equalized speech wave, first detector means in circuit relation with said equalizer means for deriving from said equalized speech wave a first control signal with a magnitude representative of the frequency location of a formant of said equalized speech wave, first suppressor means under the control of said first control signal and supplied with said equalized speech wave for individually suppressing in said equalized speech wave each frequency component in the vicinity of the formant represented by said first control signal to obtain a first suppressed formant speech wave, second detector means in circuit relation with said first suppressor means for deriving from said first suppressed formant speech wave a second control signal with a magnitude representative of the frequency location of a formant of said first suppressed formant speech wave, second suppressor means under the control of said second control signal and supplied with said suppressed formant speech wave for individually suppressing in said suppressed formant speech wave each frequency component in the vicinity of the formant represented by said second control signal to obtain a second suppressed formant speech wave, third detector means in circuit relation with said second suppressor means for deriving from said second suppressed formant speech wave a third control signal with a magnitude representative of the frequency location of a formant of said second suppressed formant speech wave, formant ordering means supplied with said first, second, and third control signals and provided with first, second, and third output terminals for arranging said first, second, and third control signals on said output terminals in a predetermined order according to their relative magnitudes, speech synthesizing means provided with first, second, and third input terminals in correspondence with said first, second, and third output terminals of said formant ordering means for reconstructing a replica of said incoming speech wave, and means for connecting said first, second, and third output terminals of said formant ordering means to said corresponding first, second, and third input terminals of said speech synthesizing means.

4. Apparatus for determining the frequency locations of selected formants of a speech wave which comprises a source of an incoming speech wave, equalizer means supplied with said speech wave for enhancing the relative amplitudes of low-frequency components of said speech wave by predetermined relative amounts to obtain an equalized speech wave, first detector means in circuit relation with said equalizer means for deriving from said equalized speech wave a first control signal representative of the frequency location of a first selected formant of said equalized speech wave, first suppressor means under the control of said first control signal and supplied with said equalized speech wave for suppressing in said equalized speech wave the speech components in the vicinity of the formant represented by said first control signal to obtain a first suppressed formant speech wave, a first high pass filter supplied with said first suppressed formant speech wave and having an adjustable low-frequency cutoff point controlled by said first control signal to remove unwanted low-frequency components with large amplitudes from said first suppressed formant speech wave, second detector means in circuit relation with said first high pass filter for deriving a second control signal representative of the frequency location of a second selected formant of said equalized speech wave, second suppressor means under the control of said second control signal and in circuit relation with said first high pass filter for suppressing in said first suppressed formant speech wave the speech components in the vicinity of the formant represented by said second control signal to obtain a second suppressed formant speech wave, a second high pass filter supplied with said second suppressed formant speech wave and having an adjustable low-frequency cutoff point controlled by said second control signal to remove unwanted low-frequency components with large amplitudes from said second suppressed formant speech wave, third detector means in circuit relation with said second high pass filter for deriving a third control signal representative of the frequency location of a third selected formant of said speech wave, and speech synthesizing means provided with said first, second, and third control signals for reconstructing a replica of said incoming speech wave.

References Cited

UNITED STATES PATENTS

| | | | |
|---|---|---|---|
| 2,803,801 | 8/1957 | Cunningham | 179—1 |
| 3,190,960 | 6/1965 | Lawrence | 179—1 |

KATHLEEN H. CLAFFY, *Primary Examiner.*

R. MURRAY, *Assistant Examiner.*